United States Patent
Ferri et al.

(10) Patent No.: US 12,429,818 B2
(45) Date of Patent: Sep. 30, 2025

(54) PROVIDING UNIFORM BACKGROUND IMAGE ILLUMINATION WITH ZERO-ORDER LIGHT FROM A PHASE LIGHT MODULATOR TO A SPATIAL LIGHT MODULATOR

(71) Applicant: TEXAS INSTRUMENTS INCORPORATED, Dallas, TX (US)

(72) Inventors: John Ferri, Allen, TX (US); Alexander Lyubarsky, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 659 days.

(21) Appl. No.: 17/848,310

(22) Filed: Jun. 23, 2022

(65) Prior Publication Data
US 2023/0142442 A1    May 11, 2023

Related U.S. Application Data

(60) Provisional application No. 63/277,739, filed on Nov. 10, 2021.

(51) Int. Cl.
G03H 1/22 (2006.01)
G03H 1/08 (2006.01)

(52) U.S. Cl.
CPC ......... *G03H 1/2294* (2013.01); *G03H 1/0808* (2013.01); *G03H 2225/32* (2013.01)

(58) Field of Classification Search
CPC ............. G03H 1/12294; G03H 1/0808; G03H 1/2205; G03H 1/0005; G03H 2225/12; G03H 2225/60; G03H 2225/32; G03H 2001/0224; G03H 2223/19
See application file for complete search history.

(56) References Cited

U.S. PATENT DOCUMENTS 9,848,176 B2    12/2017 Damberg et al.
2021/0003854 A1*    1/2021 Bartlett .................... G03H 1/32

* cited by examiner

*Primary Examiner* — Angela M. Medich
(74) *Attorney, Agent, or Firm* — Michael T. Gabrik; Frank D. Cimino

(57) ABSTRACT

An apparatus includes a phase light modulator (PLM) configured to produce background image illumination including background image light and zero-order light, a first lens array including first lenses optically coupled to the PLM and configured to project the background image light, a second lens array optically coupled to the first lens array and including second lenses configured to project the background image light, an optical tunnel extending between the first lens array and the second lens array, optically coupled to the PLM and configured to project a zero-order light, an embedded lens in the second lens array optically coupled to the optical tunnel and configured to focus the zero-order light from the optical tunnel, and focusing optics optically coupled to the second lens array and the embedded lens and configured to focus the background image light and the zero-order light onto a background image plane of a spatial light modulator.

14 Claims, 8 Drawing Sheets

PROVIDING UNIFORM BACKGROUND IMAGE ILLUMINATION WITH ZERO-ORDER LIGHT FROM A PHASE LIGHT MODULATOR TO A SPATIAL LIGHT MODULATOR

CROSS-REFERENCE TO RELATED APPLICATIONS

The present application claims priority to U.S. Provisional Patent Application No. 63/277,739, which was filed Nov. 10, 2021, is titled "Optical Method For Utilizing Zero Order Light In A Phase Light Modulator (PLM) To Spatial Light Modulator Illuminator (SLM)," and is hereby incorporated herein by reference in its entirety.

BACKGROUND

Projection-based displays project images onto surfaces, such as onto a wall or a screen, to present video or still pictures. Such displays can include cathode-ray tube (CRT) displays, liquid crystal displays (LCDs), and spatial light modulator (SLM) displays, etc.

SUMMARY

In accordance with at least one example of the disclosure, an apparatus includes a phase light modulator (PLM) configured to produce background image illumination including background image light and zero-order light, a first lens array including first lenses optically coupled to the PLM and configured to project the background image light, a second lens array optically coupled to the first lens array and including second lenses configured to project the background image light projected from the first lens array, an optical tunnel extending between the first lens array and the second lens array, where the optical tunnel is optically coupled to the PLM and configured to project the zero-order light, an embedded lens in the second lens array optically coupled to the optical tunnel and configured to focus the zero-order light projected by the optical tunnel, and focusing optics optically coupled to the second lens array and to the embedded lens and configured to focus the background image light and the zero-order light onto a background image plane of an SLM.

In accordance with at least one example of the disclosure, a device includes one or more light sources, a PLM optically coupled to the one or more light sources, a first lens array optically coupled to the PLM and comprising first lenses, a second lens array optically coupled to the first lens array and comprising second lenses, an optical tunnel extending between the first lens array and the second lens array, an embedded lens in the second lens array optically coupled to the optical tunnel, focusing optics optically coupled to the second lens array and to the embedded lens and comprising one or more focusing lenses, and a SLM optically coupled to the focusing optics.

In accordance with at least one example of the disclosure, a method includes modulating, by a PLM, incident light to produce background light illumination comprising background image light and zero-order light to a first lens array, projecting, by the first lens array, the background image light towards a second lens array, projecting, by an optical tunnel extending between the first lens array and the second lens array, the zero-order light towards an embedded lens in the second lens array, projecting, by the second lens array, the background image light towards focusing optics, projecting, by the embedded lens, the zero-order light towards the focusing optics, focusing, by the focusing optics, light comprising the background image light and the zero-order light towards a SLM, and modulating, by the SLM, the focused light to project an image.

DETAILED DESCRIPTION

Figure 1:
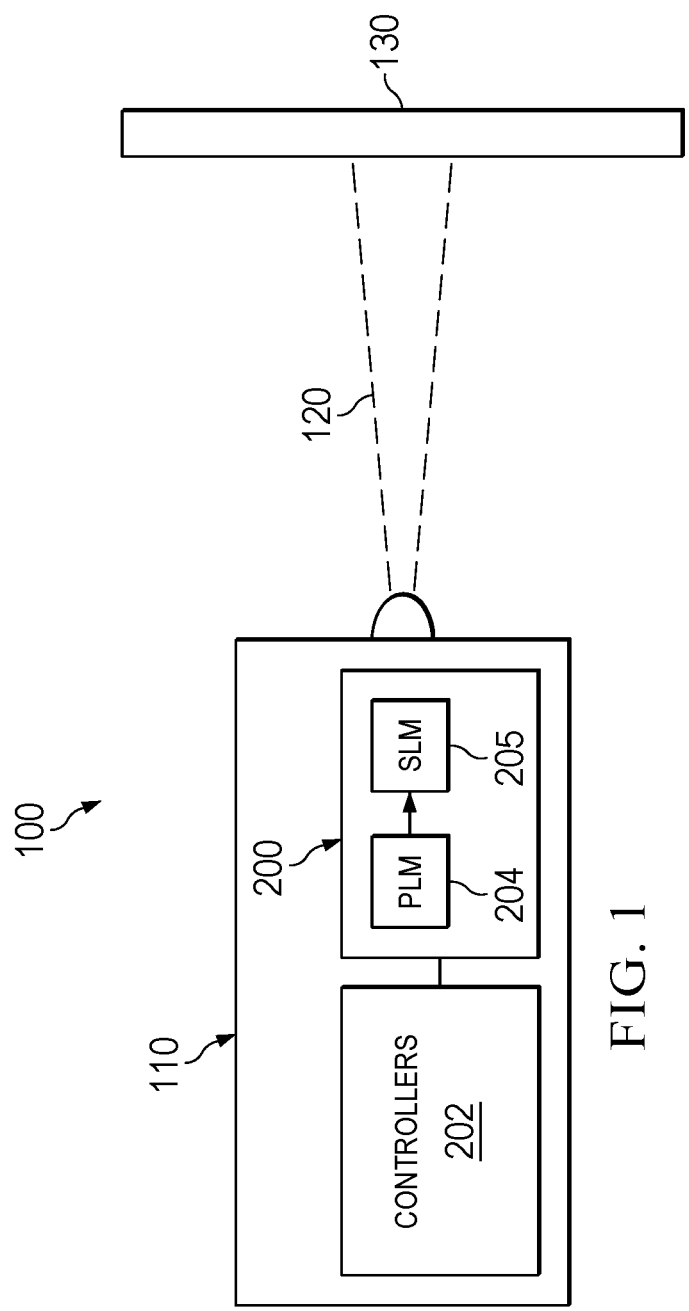
FIG. 1 is a diagram of a display system, in accordance with various examples.

A projection-based display system can include a SLM device which includes optical elements, such as mirrors or apertures, to generate an image. An SLM modulates the intensity of the light projected on the display by controlling the optical elements to manipulate the light and form the pixels of an image. The SLM may be a digital mirror device (DMD) in which the optical elements are tilting micromirrors. Each micromirror projects a pixel of the image to be displayed. The micromirrors are tilted by applying voltages to the micromirrors to project dark, bright, or shades of light per pixel. Other examples of SLMs include liquid crystal on silicon (LCoS) devices, ferroelectric liquid crystal on silicon (FLCoS) devices, and liquid crystal displays (LCDs). An LCoS device includes an array of liquid crystals on a reflective layer, which form the optical elements or pixels that are controlled to reflect and modulate the intensity of light. The intensity of light is modulated by applying voltage to the liquid crystals, which reorients the crystals in the pixels and accordingly controls the amount of light projected. An FLCoS device includes ferroelectric liquid crystals which have faster voltage than conventional liquid crystals. This causes faster light modulation in the FLCoS devices in comparison to LCoS devices. The optical elements or pixels of an LCD are formed of a transmissive array of liquid crystals that can be controlled, by voltage, to modulate light transmitted through the LCD. AN A projection-based display system may also include multiple light sources, such as laser light sources, of different wavelengths to provide color modes rather than a single lamp or light bulb. The light sources can be operated by simultaneously projecting color modes on the SLM surface to form the image.

The projection-based display can also include a PLM positioned between the light sources and the SLM. A PLM may be a micro-electromechanical system (MEMS) device including micromirrors that have adjustable heights with respect to the PLM surface. The heights of the micromirrors can be adjusted by applying voltages. The micromirrors may be controlled with different voltages to form a diffraction surface on the PLM. A controller can control, by applying voltage, the micromirrors individually or in group of adjacent micromirrors to form the diffraction surface. For example, each micromirror can be coupled to respective electrodes for applying a voltage and controlling the micromirror independently from the other micromirrors of the PLM. The diffraction surface is a phase altering reflective surface to light incident from the light sources. The phase altering reflective surface forms a hologram for projecting illumination patterns of light that form an image onto an image projection surface for viewing the image. The holograms are formed by adjusting the heights of the micromirrors to form the diffraction surface of the PLM. The micromirrors of the PLM may be controlled by changing the voltages applied to the micromirrors to modify the diffraction surface and accordingly the hologram. This also changes the angle by which the incident light on the surface of the PLM is reflected with respect to the surface.

The PLM can be controlled to reflect and project the incident light from the light sources onto the surface of the SLM through focusing and projection optics. The reflected light from the PLM provides a backlight to the SLM according to high dynamic range (HDR) modulation technique that increase image brightness. According to the HDR modulation technique, the light distribution on the SLM is modulated by the PLM to cause pixel areas in the image to receive more light intensity causing brighter areas in the image.

The diffraction surface formed by the PLM to modulate and reflect the incident light from the light sources can also split the incident light into multiple light beams, also referred to herein as diffraction orders, that are reflected by the PLM. The diffraction surface includes a structure of repeated surface patterns formed by the micromirrors, also referred to herein as a diffraction grating. The surface patterns are repeated periodically in a direction across the surface and cause the splitting of an incident light beam into the diffraction orders. The incident light beam is formed of an electromagnetic (light) wave having a phase that is altered by the diffraction surface, which splits the light wave into multiple light waves with different phases. The light waves having different phases are reflected by the diffraction surface in different directions and form the diffraction orders. Accordingly, the diffraction orders are reflected away from the surface at different reflection angles, also referred to herein as diffraction angles. The directions or diffraction angles of the diffraction orders depend on the incident angle of the incident light beam, the period of the repeated surface patterns of the diffraction surface, and the wavelength of the incident light. The diffraction orders may also have different intensities. The diffraction surface can also cause the PLM to reflect, such as because of inefficiencies or manufacturing errors in the PLM, a smaller portion of the incident light into a light beam in a center position between the diffraction orders, also referred to herein as a zero-order light. For example, the zero-order light can be approximately 10 percent (%) of the reflected light from the PLM, and the diffraction orders can be approximately 90% of the reflected light. If projected onto the SLM, the zero-order light may illuminate the SLM surface in a nonuniform manner which can cause a variation of illumination on the SLM surface and accordingly nonuniform brightness across the image projected from the SLM. If the zero-order light is blocked instead from reaching the SLM, the overall illumination of the SLM surface is reduced which can reduce brightness in the projected image.

This description includes various examples of a display device configured for projecting zero-order light from a PLM onto a SLM for projecting an image to provide uniform illumination of the image without reducing zero-order light intensity. Uniform illumination refers to distributing light evenly across the entire image to illuminate the image without excluding parts of the image. Uniform illumination of the image is provided without blocking the zero-order light which increases light energy efficiency of the device. The zero-order light is projected onto a SLM with other reflected light that form the background image for the SLM, also referred to herein as background image light, such as in HDR image projection. The background image light from the PLM includes the diffraction orders formed by the diffraction surface of the PLM. The same background image can be projected simultaneously on multiple diffraction orders by the PLM. PLM background images projected by the diffraction orders are combined into a single projected image on an image projection surface. Combining multiple instances of a background image that are projected simultaneously by the PLM can provide a more uniform background image for the SLM. For example, the brightness and accordingly the illumination across the combined background image can be more uniform than the illumination across the respective background images. While the individual projected background images can have more illumination on different parts of the image, the illumination in the combined background image can be more even across the image. A background image with more uniform illumination increases the quality of the image projected by the SLM, as perceived by the human visual system (HVS). An apparatus of the display device includes an optical tunnel and optics that are configured to collect the zero-order light from the PLM, direct the zero-order light onto the SLM, and project the zero-order light to provide uniform illumination on the SLM surface. Accordingly, the zero-order light is projected with the background image light, including the diffraction orders, to increase the brightness of the projected image and provide uniform brightness across the projected image.

FIG. 1 shows a display system 100, in accordance with various examples. The display system 100 may be a projection-based display system for projecting images or video, such as according to HDR image projection. The display system 100 includes a projection-based display device 110 configured to project a modulated light 120 onto an image projection surface 130 for viewing the image. Examples of the image projection surface 130 include a wall or a viewing screen. For example, the viewing screen may be a wall screen, a screen of an augmented reality (AR) or virtual reality (AR) display, a three-dimensional (3D) display, the ground or road for a headlight display, a projection surface in a vehicle such as for a windshield projection display, or other display surfaces for projection-based display systems.

The modulated light 120 may be modulated by the display device 110 to project still images or moving images, such as video, onto the image projection surface 130. The modulated light 120 may be formed as a combination of light with multiple color modes provided by the display device 110.

The display device 110 includes an apparatus 200 having one or more light sources (not shown) for providing the light at different wavelengths for the color modes. The light at the different wavelengths is modulated by a PLM 204 in the apparatus 200 to provide background image light and zero-order light to a SLM 205 of the apparatus 200. The SLM 205 provides, based on the background image light and zero-order light, the modulated light 120 that is projected on the image projection surface 130. The display device 110 also includes one or more controllers 202 coupled to the apparatus 200 for controlling the components of the display device 110 to display the images or video. For example, the controllers 202 can include a first controller for controlling the PLM 204 to modulate light of different wavelengths from respective light sources. The SLM 205 can also be controlled by a second controller 202 to modulate the light from the PLM 204 and provide the modulated light 120. The controllers 202 may also include a third controller for controlling the light sources. The display device 110 may further include one or more input/output devices (not shown), such as an audio input/output device, a key input device, a display, and the like.

Figure 2:
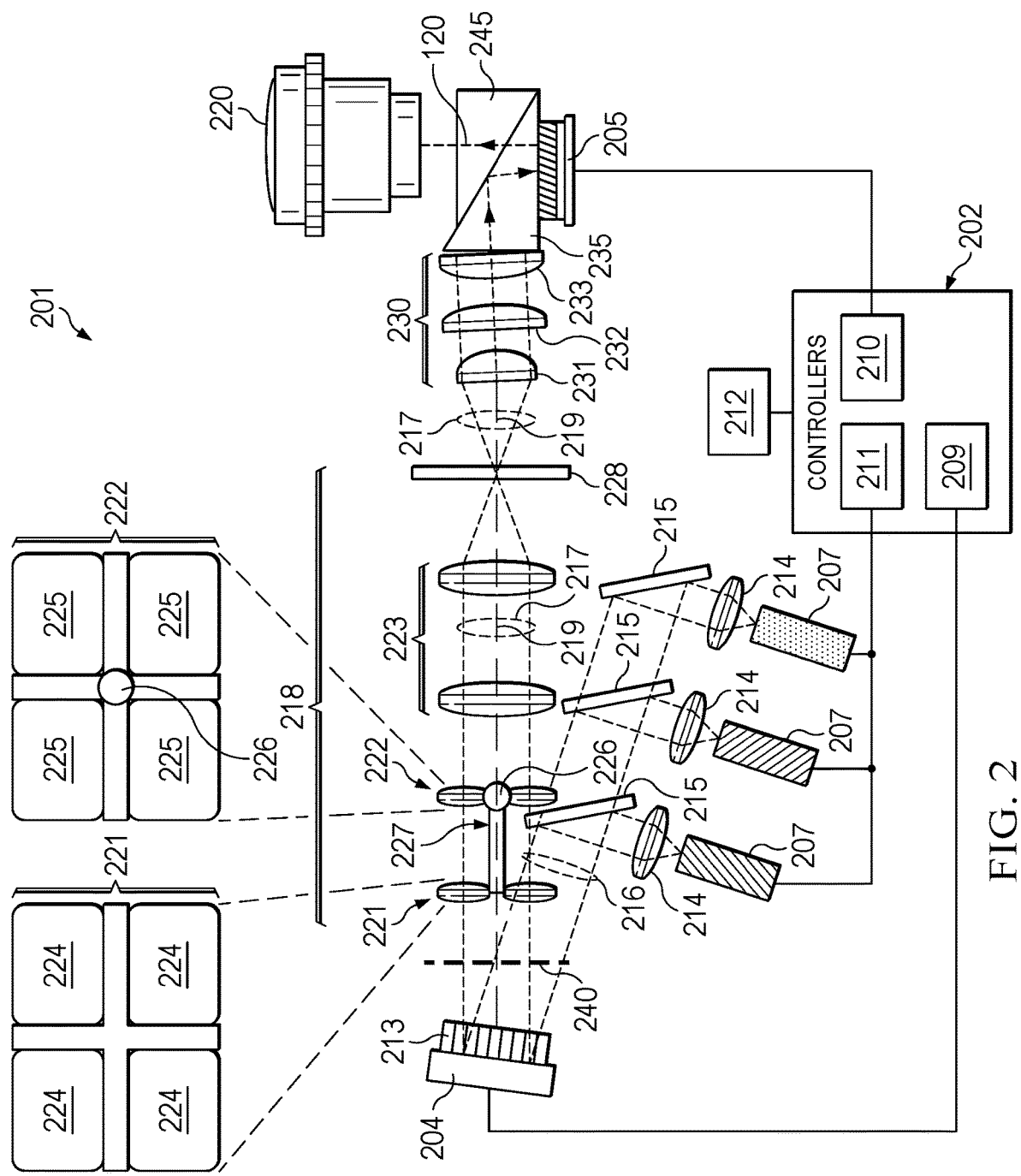
FIG. 2 is a diagram of an apparatus of a display device of the display system of FIG. 1, in accordance with various examples.

FIG. 2 shows an apparatus 201 for projecting images, in accordance with various examples. For example, the apparatus 201 can be part of the display device 110 that projects a modulated light 120, such as for HDR image projection. The apparatus 201 includes the PLM 204, the SLM 205, one or more light sources 207, and a projection optics 220 that projects the modulated light 120 on the image projection surface 130. The projection optics 220 can include a single projection lens, as shown in FIG. 2, or can include multiple lenses in other examples. The PLM 204, the one or more light sources 207, and the SLM 205 are coupled to and controlled by the controllers 202 of the display device 110.

In an example, the controllers 202 may include a first controller 209 for controlling the PLM 204, a second controller 210 for controlling the SLM 205, and a third controller 211 for controlling the one or more light sources 207. The controllers 202 may also include or may be coupled to a processor 212 configured to coordinate between the controllers 202 to control the PLM 204, the one or more light sources 207, and the SLM 205, and accordingly modulate the modulated light 120 to provide the image for projection. For example, the first controller 209 may be an analog controller for controlling micromirrors 213 of the PLM 204. The analog controller can control switching each of the micromirrors 213 of the PLM 204 between multiple discrete and different heights. The second controller 210 of the PLM 204 can include or be coupled to a static random-access memory (SRAM) (not shown) including an array of memory cells each configured to store bits of memory value for adjusting a respective optical element of the PLM 204. The memory value is useful to switch the optical element to a discrete height. The second controller 210 may be a digital controller for controlling the optical elements of the SLM 205, such as micromirrors of a DMD or liquid crystals of an LCoS or LCD. The digital controller can control switching each of the optical elements of the SLM 205, between an on state and an off state. In the case of a DMD, the on state can rotate a micromirror to reflect/project light to provide a bright pixel in the image, and the off state can rotate the optical element to stop reflecting/projecting light to provide a dark pixel in the image. In the case of an LCoS, FLCoS or LCD, the on state can cause transmitting or reflecting light by the liquid crystal, and the off state can cause blocking the light by the liquid crystal. The second controller 210 of the SLM 205 can include or be coupled to a SRAM (not shown) where each memory cell is configured to store one bit of memory value for adjusting a respective optical element of the PLM 204. The one-bit memory value is useful to switch the optical element between the on state for reflecting/projecting light and the off state to stop reflecting/projecting light. For example, a zero-bit value can switch the optical element to an off state and a one-bit value can switch the optical element to an on state. The third controller 211 can be a digital controller configured to control switching the one or more light sources 207 on and off, or an analog controller that controls and changes the level of light intensity of the one or more light sources 207.

The PLM 204 can be operated according to HDR modulation techniques to increase the brightness and contrast in the image projected by the SLM 205 on the image projection surface 130. The image brightness provided by the SLM 205 can be reduced in one or more areas on the surface of the SLM 205 which include pixels that are switched to the off state. In such areas, the light is provided by pixels of the SLM 205 that are switched to the on state, and the brightness lost in such areas can depend on the number of pixels that are switched to the off state. According to the HDR modulation technique, light can be projected and spatially modulated by the PLM 204 to distribute light at the surface of the SLM 205 to cause brighter regions and higher contrast in the image. The light projected by the PLM 204 onto the surface of the SLM 205 compensates for the reduced brightness in the areas of the SLM 205 with the switched off pixels. The spatially modulated light by the PLM 204 can also be projected onto the SLM 205 as background image light that illuminates certain regions of the pixels excluding other regions. Restricting the illumination of the SLM 205 to certain regions of the pixels causes the SLM 205 to provide a higher contrast by the modulated light 120, where the illuminated pixel regions project brighter areas of the image while the remaining areas remain dark.

The PLM 204 includes the PLM micromirrors 213 as adjustable optical elements which form a grid of pixels on the surface of the PLM 204. The heights of the PLM micromirrors 213 with respect to the surface can be adjusted by applying voltages to the PLM 204. The first controller 209 controls the PLM 204 by changing the voltages applied to the PLM 204 to adjust the heights of the PLM micromirrors 213, which form a diffraction surface. The diffraction surface is formed by providing different heights of the PLM micromirrors 213 across the grid of pixels on the surface. The diffraction surface of the PLM micromirrors 213 modulates and reflects an incident light 216 from the one or more light sources 207. For example, the incident light 216 includes one or more color modes at respective wavelengths that are directed from the one or more light sources 207 to the PLM 204 through respective lenses 214 and mirrors 215. In examples, the light sources 207 can be three light sources that provide three color modes at three respective wavelengths, such as for blue, green, and red light. As shown in FIG. 2, the mirrors 215 can be dichroic mirrors configured to reflect the light from the respective light sources 207 for the respective color modes to the PLM 204, and transmit light for the other color modes from the other mirrors 215 on a same optical path to the PLM 204. In other examples, the mirrors 215 can be reflective mirrors that reflect the light from the respective light sources 207 on separate optical paths to the PLM 204. The lenses 214 can be similar lenses that determine the diameter and beam profile of the incident light 216 on the surface of the PLM 204. In other examples, the color modes of the incident light 216 from the one or more light sources 207 to the PLM 204 can be directed by other optics or can be projected in a straight path without optical elements.

The light sources 207 can be controlled, by a controller 202 (e.g., third controller 211), to project the incident light 216 for each color mode at a time to the PLM 204 in a time multiplexing sequence. Accordingly, each light source 207 is switched on at a time in a certain sequence and rate to project light at a respective color mode from the PLM 204 to the SLM 205. This causes projecting in the modulated light 120 each color mode at a time at the same rate. The rate can be sufficiently fast to perceive, by the HVS, the time multiplexed color modes in the projected image as a single full color image. For example, the image projection rate can be between 1/30 and 1/60 second.

The incident light 216 from the one or more light sources 207 is modulated and reflected by the PLM 204 to provide a background image light 217 which is projected through a background image optical path 218 towards the SLM 205. The background image light 217 forms the background image on the surface of the SLM 205 and includes diffraction orders provided by modulating and reflecting the incident light 216 by the diffraction surface of the PLM micromirrors 213. The diffraction surface also provides a zero-order light 219 projected at a center position with respect to the other diffraction orders of the background image light 217 in the background image optical path 218 and onto the center of the background image on the surface of the SLM 205. The apparatus 201 includes in the background image optical path 218 a first lens arrays 221, a second lens array 222, and focusing optics 223 positioned between the PLM 204 and the SLM 205.

For example, the first lens array 221 is a N×N array of lenses 224, where N is an integer number. The N×N array is an array of adjacent lenses 224 that are arranged across the first lens array 221 and face the PLM 204. The second lens array 222 is also a N×N array of lenses 225, where N is the same number of the lenses 224 in the first lens array 221. The lenses 225 in the second lens array 222 may be similar to and have the same size of the lenses 224. For example, the first lens array 221 can include four adjacent lenses 224 that are arranged in a 2×2 array (as shown in a front view of first lens array 221 in FIG. 2). In this case, the second lens array 222 also includes four lenses 225 similar to and aligned respectively with the four lenses 224. Each pair of lenses 224 and respective lens 225 can project a respective image in the diffraction orders of the background image light 217 from the PLM 204 to the focusing optics 223. The lenses 224 and similarly the lenses 225 may be rectangular or circular lenses. In other examples, the lenses 224 and 225 may have other shapes. The shapes of the lenses 224 and 225 determine the beam profile of the background image light 217 and accordingly the shape of the projected background image. For example, square lenses 224 and 225 can provide a square shaped background image, or rectangular lenses 224 and 225 can provide a rectangular shaped background image. The second lens array 222 also includes an embedded lens 226 positioned at the center of the second lens array 222 between the lenses 225. The size (e.g., diameter) of the embedded lens 226 may be smaller than the diameter of the lenses 224 in the second lens array 222. The embedded lens 226 can project the zero-order light 219 projected from the PLM 204 through the first lens array 221 to the focusing optics 223.

An optical tunnel 227 is also positioned between the first lens array 221 and the second lens array 222. The optical tunnel 227 is configured to transmit the zero-order light 219 from the first lens array 221 to the second lens array 222. The optical tunnel 227 is an optical waveguide for the zero-order light 219 that extends from the center of and through the first lens array 221 to the center of the second lens array 222. The embedded lens 226 is configured to focus and project the zero-order light 219 from the optical tunnel 227 onto the focusing optics 223.

The focusing optics 223 can include one or more focusing lenses that are positioned and aligned to focus the background image light 217 onto an intermediate image plane in the background image optical path 218. The intermediate image plane is at the focus point of the focusing optics 223. A diffuser 228 can be positioned in the intermediate image plane to reduce speckle that may be caused by wave interference in the background image light 217, such as in the case of light sources 207 for coherent light (e.g., laser light sources). The apparatus 201 further includes illumination optics 230 including one or more lenses between the intermediate image plane at the diffuser 228 and the SLM 205. The illumination optics 230 project the background image light 217 and the zero-order light 219 from the intermediate image plane at the diffuser 228 or the focus point of the focusing optics 223 onto the surface of the SLM 205. For example, as shown in FIG. 2, the illumination optics 230 can include a first lens 231 that collimates a spreading or defocused beam of the background image light 217 from the from the diffuser 228, and a second lens 232 that focuses the collimated beam from the first lens 231 onto a third lens 233 of the illumination optics 230. The third lens 233 projects and adjusts the profile of the background image light 217 to fit on the surface of the SLM 205. In other examples, the illumination optics 230 can include fewer or more than three lenses to project and adjust the profile of the background image light 217 from the diffuser 228 on the SLM 205. The apparatus 201 may include a first prism 235 positioned between the illumination optics 230 and the SLM 205. The first prism 235 directs the background image light 217 and the zero-order light 219 from the illumination optics 230 onto the SLM 205.

The background image light 217 is projected by the lenses 224 in the first lens array 221, and by the lenses 225 in the second lens array 222, onto the surface of the SLM 205 through the focusing optics 223, the illumination optics 230, and the first prism 235. For example, a 2×2 array of lenses 224 projects the diffraction orders of the background image light 217 to form a background image at the SLM 205. Accordingly, the PLM 204 projects, on the diffraction orders in the background image light 217, four PLM background images to a PLM image plane 240 in front of the first lens arrays 221. Each pair of lenses 224 and 225 in the first and second lens array 221 and 222, respectively, projects one of the four images. The PLM background images are projected, combined, and imaged, by the optics in the background image optical path 218 and the illumination optics 230, into a background image at the SLM 205. Projecting and combining multiple background images can provide more uniform illumination across the background image at the SLM 205. The number of lenses 224 in the first lens array 221, and similarly of the lenses 225 in the second lens array 222, matches the number of projected background images, where each pair of lenses 224 and 225 is aligned and configured to project one of the background images in the optical path 218. In other examples, fewer or more than four images can be projected by the PLM 204 on the diffraction orders of the background image light 217 to form a single combined background image at the SLM 205. For example, the number of background images may be a multiple of two, such as two, four, or eight background images projected simultaneously by the PLM 204. Increasing the number of images can increase the uniform illumination across the background image at the SLM 20, and also increase the number of lenses in the first and second lens arrays 221 and 222. In the example of FIG. 2, four background images are provided by the PLM 204 to increase the uniform illumination across the background image at the SLM 205 and limit of the number of lenses 224 and 225 in the first and second lens arrays 221 and 222, respectively, to four lenses.

In examples, the SLM 205 can be a DMD. The DMD includes DMD micromirrors as adjustable optical elements which form a grid of pixels on the surface of the DMD. The tilt of the DMD micromirrors with respect to the surface can be adjusted by applying voltage to the DMD. The second controller 210 can control the SLM 205 by changing the voltages applied to the DMD to adjust the tilt of the respective DMD micromirrors. Controlling the DMD by tilting the DMD micromirrors modulates and reflects the background image light 217 and the zero-order light 219 to provide the modulated light 120 from the DMD to the projection optics 220. The background image light 217 combined with the zero-order light 219 increase illumination at the surface of the SLM 205 and accordingly the illumination in the modulated light 120 projected through the projection optics 220. The increased illumination in the modulated light 120 increases the brightness in the projected image on the image projection surface 130. The background image light 217 and the zero-order light 219 can also compensate for loss of illumination in the modulated light 120 by the SLM 205 if a DMD micromirrors is switched to an off state to provide a dark pixel in the image. The loss of illumination can increase if more DMD micromirrors of the SLM 205 are switched off.

The apparatus 201 may also include a second prism 245 positioned between the SLM 205 and the projection optics 220 to direct the modulated light 120 from the SLM 205 to the projection optics 220. The modulated light 120 provides the image projected on the image projection surface 130 which includes illumination from the zero-order light 219 as reflected by the SLMs 205.

In other examples, the SLM 205 can be a SLM device other than a DMD with adjustable optical elements other than micromirrors. For example, the SLM 205 can be an LCoS or FLCoS with adjustable reflective liquid crystals that form a grid of pixels on the surface of the LCoS or FLCoS. In this case, the LCoS or FLCoS can also be arranged similarly to a DMD, as shown in FIG. 2, where the first prism 235 is positioned between the illumination optics 230 and the LCoS/FLCoS, and the second prism 245 is positioned between the LCoS/FLCoS and the projection optics 220. In another example, the SLM 205 can be an LCD including an array of adjustable transmissive liquid crystals, which form a grid of pixels of the LCD. In this case, the LCD can be aligned with projection optics (e.g., similarly to the projection optics 220) to face illumination optics (e.g., similarly to the illumination optics 230) in a straight optical path. The LCD is placed between the illumination optics and the projection optics on this straight optical path. The transparency or opacity of the liquid crystals in such devices can be adjusted by applying voltage. The second controller 210 can control the SLM 205 by changing the voltages applied to the liquid crystals to adjust the orientation of the liquid crystals in the pixels, an accordingly, the optical properties, such as the refractive index, of the liquid crystals. Light can be modulated by changing the amplitude, phase, or polarization of light waves based on the optical properties of the liquid crystals. The liquid crystals are controlled to reflect or transmits the background image light 217 and the zero-order light 219 to provide the modulated light 120 from the DMD to the projection optics 220.

Figure 3:
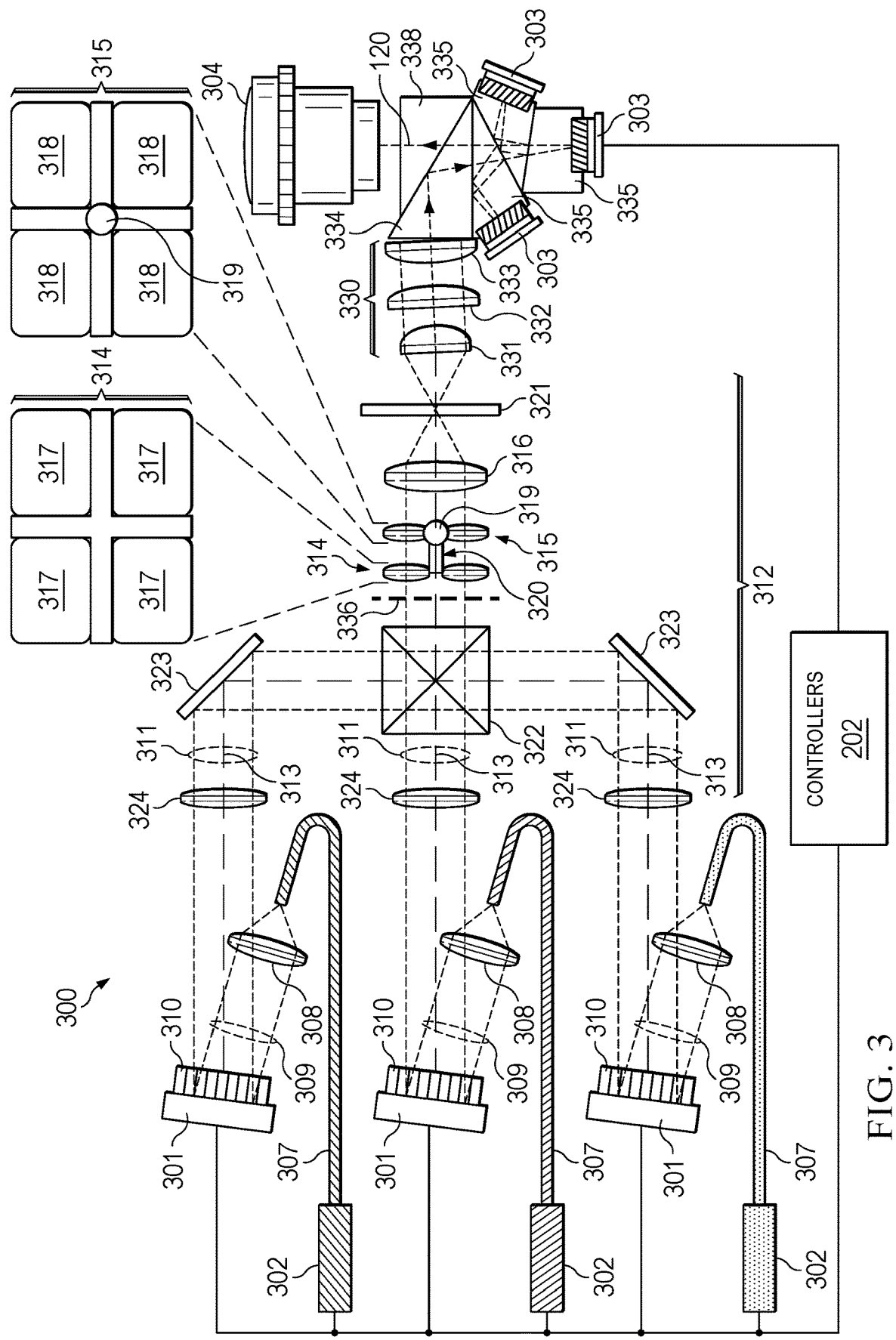
FIG. 3 is a diagram of an apparatus of a display device of the display system of FIG. 1, in accordance with various examples.

In other examples, the display device 110 may include multiple pairs of PLMs and respective SLMs, each pair corresponding to a color mode from a respective light source. In this case, each pair of PLM and SLM can modulate a color mode separately which increases the diffraction efficiency and the projected intensity of each color mode and accordingly increases image quality and power efficiency of the display device 110. FIG. 3 shows an apparatus 300 of the display device 110, in accordance with various examples. The apparatus 300 includes three PLMs 301, three respective light sources 302, three respective SLMs 303, and a projection optics 304 that projects the modulated light 120 on the image projection surface 130. The projection optics 304 can include a single projection lens or can include multiple lenses in other examples. The PLMs 301, the light sources 302, and the SLMs 303 are coupled to and controlled by the controllers 202 of the display device 110, which can include. For example, the controllers 202 can include a first controller 202 for controlling the PLMs 301 to modulate light of different wavelengths from respective light sources 302. The SLMs 303 can also be controlled by a second controller 202 to modulate the light from the respective PLMs 301 and provide the modulated light 120. The first and second controllers 202 can be digital controllers that switch the optical elements of the PLMs 301 and SLMs 303, respectively, between on and off states. The controllers 202 can also include an analog controller 202 configured to process the image data to provide digital signals to the first and second controllers 202.

The light sources 302 provide three color modes of light, respectively. For example, the color modes include blue light, green light, and red light. The light modes can be directed through respective optical fibers 307 to the respective PLMs 301. For each color mode, an incident light 309 is projected from a light source 302 to a respective PLM 301 through a respective lens 308. The PLMs 301 include respective PLM micromirrors 310 with adjustable heights that are controlled by the controller 202 to modulate and reflect the incident light 309. The incident light 309 from each light source 302 is modulated and reflected by the respective PLM 301 to provide a respective background image light 311. The light sources 302 can be switched on and off, by a controller 202, to project the incident light 309 for each color mode at a time to a respective PLM 301 in a time multiplexing sequence at a certain rate.

The background image light 311 from each PLM 301 is projected through a background image optical path 312 towards the SLM 303. According to time multiplexing, each PLM 301 can project the background image light 311 for a respective color mode at a time from a respective light source 302 to a respective SLM 303. The background image light 311 from each PLM 301 includes diffraction orders provided by modulating and reflecting the incident light 309 by the diffraction surface of the PLM micromirrors 310. The diffraction surface also provides a zero-order light 313 projected at a center position with respect to the other diffraction orders in the background image optical path 312 and onto the center of the background image on the surface of the SLM 303. The apparatus 300 includes in the background image optical path 312 a first lens arrays 314, a second lens array 315, and focusing optics 316 positioned between the PLMs 301 and the SLMs 303.

The first lens array 314 and the second lens array 315 are N×N array of lenses, where N is an integer. For example, the first lens array 314 is a N×N array of lenses 317 that are arranged across the first lens array 314. The second lens array 315 is also a N×N array of lenses 318, where N is the same number of the lenses 224 in the first lens array 221. The lenses 318 in the second lens array 315 may be similar to and have the same size of the lenses 317. For example, the first lens array 314 can include four adjacent lenses 317 that are arranged in a 2×2 array (as shown in a front view of first lens array 314 in FIG. 3). In this case, the second lens array 315 also includes four lenses 318 similar to and aligned respectively with the four lenses 317. Each pair of lenses 317 and respective lens 318 can project a respective image in the diffraction orders of the background image light 311 from the PLMs 301 to the focusing optics 316. The lenses 317 and similarly the lenses 318 may be rectangular or circular lenses. In other examples, the lenses 317 and 318 may have other shapes. The second lens array 315 also includes an embedded lens 319 positioned at the center of the second lens array 315 between the lenses 318. The size (e.g., diameter) of the embedded lens 319 may be smaller than the diameter of the lenses 318 in the second lens array 315. The embedded lens 319 can project the zero-order light 313 projected from the PLMs 301 through the first lens array 314 to the focusing optics 316.

An optical tunnel 320 is also positioned between the first lens array 314 and the second lens array 315. The optical tunnel 320 is configured to transmit the zero-order light 313 from the first lens array 314 to the second lens array 315. The optical tunnel 320 is an optical waveguide for the zero-order light 313 that extends from the center of and through the first lens array 314 to the center of the second lens array 315. The embedded lens 319 is configured to focus and project the zero-order light 313 from the optical tunnel 320 onto the focusing optics 316. The focusing optics 316 can include one or more focusing lenses that are positioned and aligned to focus the background image light 311 onto an intermediate image plane at the focus point of the focusing optics 316. A diffuser 321 may be positioned in the intermediate image plane to reduce speckle that may be caused by wave interference in the background image light 311.

The apparatus 300 also includes in background image optical path 312 optics for directing the background image light 311 from each PLM 301 to the first lens array 314. For example, as shown in FIG. 3, a prism cube 322 is positioned on a path of the background image light 311 between one of the PLMs 301 and the first lens array 314. A mirror 323 is also positioned on the path of the background image light 311 between each of the other two PLMs 301 and the prism cube 322. The mirrors 323 direct the background image light 311 from the other two PLMs 301 to the prism cube 322. The apparatus 300 may also include in the background image optical path 312 intermediate lenses 324 to project the background image light 311 from the respective PLMs 301 onto the mirrors 323 and the prism cube 322.

The apparatus 300 further includes illumination optics 330 including one or more lenses between the intermediate image plane at the diffuser 321 and the SLMs 303. The illumination optics 330 project the background image light 311 and the zero-order light 313 from the intermediate image plane at the diffuser 321 onto the SLMs 303. For example, as shown in FIG. 3, the illumination optics 330 can include a first lens 331 that collimates a spreading or defocused beam of the background image light 311 from the from the diffuser 321, and a second lens 332 that focuses the collimated beam from the first lens 331 onto a third lens 333 of the illumination optics 330. The third lens 333 projects and adjusts the profile of the background image light 311 to fit on the surface of the SLMs 303. In other examples, the illumination optics 330 can include fewer or more than three lenses to project and adjust the profile of the background image light 311 from the diffuser 321 on the SLMs 303. The apparatus 300 may include a first prism 334 positioned between the illumination optics 330 and the SLMs 303 to direct the background image light 311 and the zero-order light 313 from the illumination optics 330 onto the SLMs 303. A prism filter 335 is also placed between each SLM 303 and the first prism 334 to filter the respective color mode in the background image light 311 which is received by the respective SLM 303. Each prism filter 335 also transmits the respective color mode in the modulated light 120 from the respective SLM 303 onto the first prism 334 towards the projection optics 304.

Each prism filter 335 is configured to direct a color mode of the background image light 311 and the zero-order light 313 provided by a respective PLM 301 to a respective SLM 303, and transmit the other color modes towards the other SLMs 303. For example, as shown in FIG. 3, a first prism filter 335 optically coupled to a first SLM 303 is configured to direct red light in the background image light 311 and the zero-order light 313 from the first prism 334 to the first SLM 303, and to transmit the remaining light in the background image light 311 and the zero-order light 313 towards a second SLM 303 and a third SLM 303. A second prism filter 335 is optically coupled to the first prism filter 335 and the second SLM 303. The second prism filter 335 is configured to direct to the second SLM 303 blue light in the background image light 311 and the zero-order light 313 which is transmitted by the first prism filter 335, and to transmit the remaining light to the third SLM 303. The third prism filter 335 is optically coupled to the second prism filter 335 and the third SLM 303. The third prism filter 335 is configured to transmit to the third SLM 303 green light in the background image light 311 and the zero-order light 313 which is transmitted by the second prism filter 335. The third prism filter 335 also transmits the green light in the modulated light 120 from the third SLM 303 to the second prism filter 335. The second prism filter 335 is configured to transmit blue light in the modulated light 120 from the second SLM 303 with the green light from the third prism filter 335 to the first prism filter 335. The first prism filter 335 transmits red light in the modulated light 120 from the first SLM 303 with the green light and blue light from the second prism filter 335 to the first prism 334 and towards the projection optics 304.

The background image light 311 is projected by the lenses 317 in the first lens array 314, and similarly the second lens array 315, onto the SLMs 303 through the focusing optics 316, the illumination optics 330, and the first prism 334. For example, a 2×2 array of lenses 317 projects diffraction orders in the background image light 311. PLM background images projected by the diffraction orders in the background image light 311 to form the background image at the SLMs 303. Accordingly, each PLM 301 projects, on the diffraction orders in the background image light 311, four PLM background images to a PLM image plane 336 in front of the first lens arrays 314. The PLM background images are projected, combined, and imaged, by the optics in the background image optical path 312 and the illumination optics 330, into a background image in the background image light 311 at the SLMs 303.

In examples, the SLMs 303 can be a DMDs. The DMDs include respective SLM micromirrors with adjustable tilts that are controlled by one or more controllers 202 to modulate and reflect the background image light 311 and the zero-order light 313 to provide the modulated light 120 from the DMD to the projection optics 220. In other examples, the SLMs 303 can be SLM devices other than DMDs with adjustable optical elements other than micromirrors. For example, the SLMs 303 can be LCoS or FLCoS devices with adjustable reflective liquid crystals that form a grid of pixels on the surface of the LCoS or FLCoS. The SLMs 303 can also be LCDs with adjustable transmissive liquid crystals. The LCDs can be aligned with and placed between projection optics (e.g., similarly to the projection optics 304) and illumination optics (e.g., similarly to the illumination optics 330) in a straight optical path. The liquid crystals in the LCoS/FLCoS or LCDs can be controlled by one or more controllers 202 by voltages to reflect or transmit the background image light 311 and the zero-order light 313 to provide the modulated light 120.

The apparatus 300 may also include a second prism 338 positioned between the prism filters 335 and the projection optics 304 to direct the modulated light 120 from the SLMs 303 to the projection optics 304. The modulated light 120 provides the image with background image light projected on the image projection surface 130 which includes uniform illumination from the zero-order light 313 as reflected by the SLMs 303.

Figure 4:
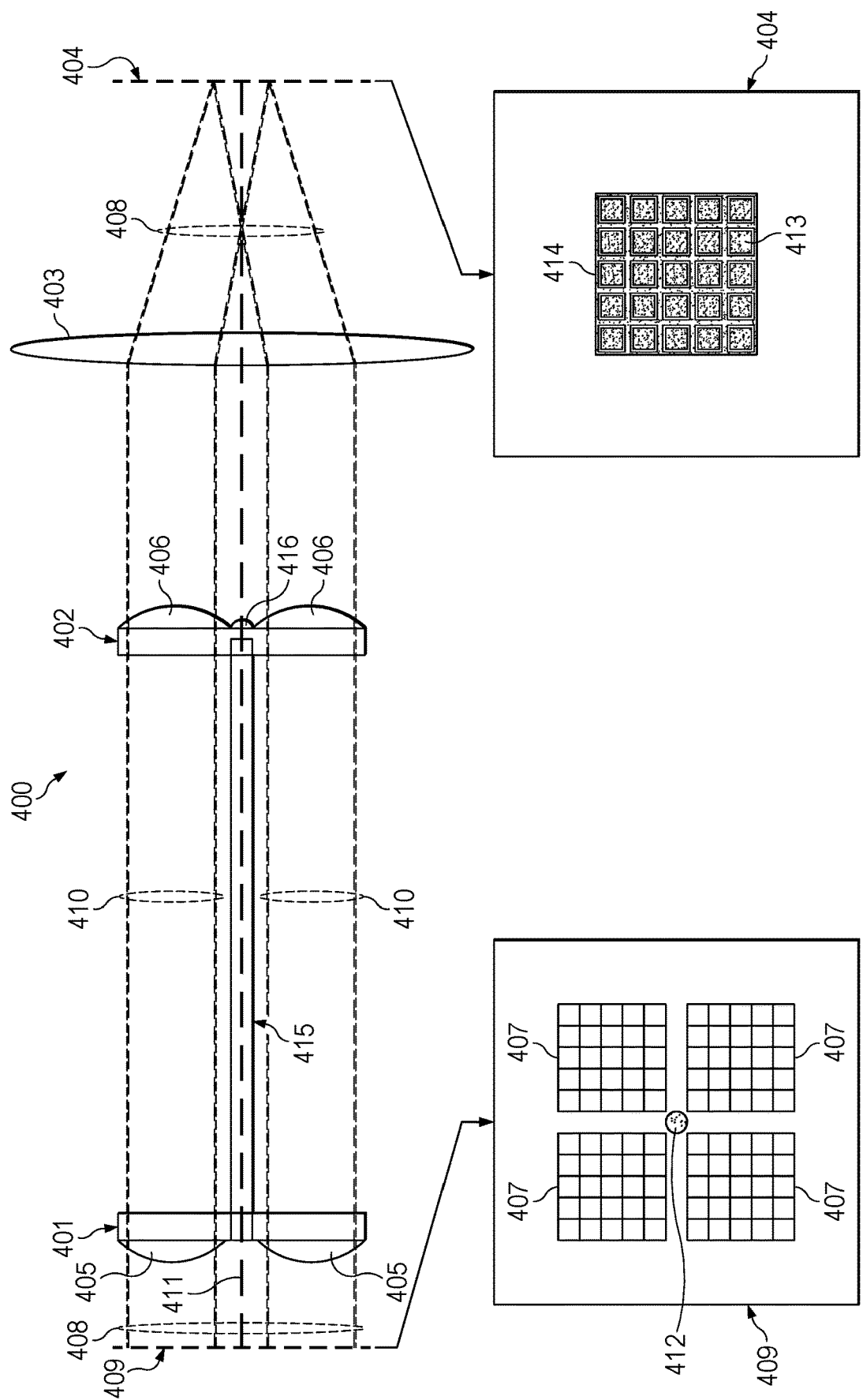
FIG. 4 is a diagram of optical elements in the display device of FIG. 2, in accordance with various examples.

FIG. 4 shows optical elements 400 in the display device 110, in accordance with various examples. The optical elements 400 may be part of the apparatus 201 in the background image optical path 218 or part of the apparatus 300 in the background image optical path 312. The optical elements 400 include a first lens array 401, a second lens array 402, a focusing lens 403, and a background image plane 404. The first lens array 401 and the second lens array 402 are N×N arrays of lenses 405 and 406 that are arranged across the first lens array 401 and second lens array 402, respectively. The lenses 406 in the second lens array 402 may be similar to and have the same size of the lenses 405 in the first lens array 401. For example, the first lens array 401 and the second lens array 402 can include four adjacent lenses 405 and four adjacent lenses 406, respectively, that are arranged in a 2×2 array. Only two of the four lenses 405 and two respective lenses 406 are shown in the cross section view of the optical elements 400 in FIG. 4.

Each of the four pairs of lenses 405 and 406 are configured and aligned to project a respective PLM background image 407 in a background image light 408 from a PLM image plane 409 in front of the first lens array 401 to the focusing lens 403. FIG. 4 also shows a front view of the PLM image plane 409 including four similar PLM background images 407. The PLM image plane 409, also referred to herein as a Fourier Transform plane, can be in front of a PLM, such as the PLM 204 in the apparatus 201 or the PLM 301 in the apparatus 300 of the display device 110. The PLM background images 407 are projected on the diffraction orders 410 that form the background image light 408 from one or more PLMs. For example, each diffraction order in the background image light 407 is useful to project one of the PLM background images 407 from the surface of the PLM through the first lens array 401, the second lens array 402, and onto the focusing lens 403. The lenses 405 in each pair of lenses 405 and 406 can project the respective PLM background image 407 in the background image light 408 at the PLM image plane 409 onto a respective lens 406, which in turn projects the PLM background image 407 in the background image light 408 onto the focusing lens 403.

For example, the first lens array 401 and second lens array 402 are the first lens array 221 and second lens array 222 of the apparatus 201 which project the background image light 217 from the PLM 204. The PLM image plane 409 is the PLM image plane 240 and the focusing lens 403 is part of the focusing optics 223 in the apparatus 201. In this case, the background image plane 404 can be on the surface of the SLM 205, or may be the intermediate image plane at the diffuser 228 or the focus point of the focusing optics 223. In another example, the first lens array 401 and second lens array 402 are the first lens array 314 and second lens array 315 of the apparatus 300 which project the background image light 311 from the PLMs 301. The PLM image plane 409 is the PLM image plane 336 and the focusing lens 403 is part of the focusing optics 316 in the apparatus 300. In this case, the background image plane 404 can be on the surface of the SLMs 303, or may be the intermediate image plane at the diffuser 321 or the focus point of the focusing optics 316.

The PLM also projects a zero-order light 411 with the background image light 408. For example, the zero-order light 411 is the zero-order light 219 projected by the PLM 204 in the apparatus 201 or the zero-order light 313 projected by the PLMs 301 in the apparatus 300. The zero-order light 411 is projected in a center position between the diffraction orders 410 of the background image light 408. Accordingly, a zero-order light spot 412 appears as the projection of the zero-order light 411 at the PLM image plane 409 in a center position between the PLM background images 407 (as shown in the front view of the PLM background images 407 in FIG. 4).

The focusing lens 403 projects and focuses the background image light 408 and the zero-order light 411 from the second lens array 402 onto the background image plane 404. FIG. 4 shows an example of one focusing lens 403 that focuses the background image light 408. In other examples, the background image light 408 and the zero-order light 411 can be focused by focusing optics including multiple lenses, such as the focusing optics 223 in the apparatus 201 or the focusing optics 316 in the apparatus 300. FIG. 4 also shows a front view of the background image plane 404. The diffraction orders 410 of the focused background image light 408 overlap in the background image plane 404 and accordingly the respective PLM background images 407 in the background image light 408 are combined into an SLM background image 414 on the background image plane 404 (as shown in the front view of the background image plane 404). In examples, the SLM background image 414 can have a rectangular image profile as the PLM background images 407. For example, FIG. 4 shows an example of square shaped PLM background images 407 that provide a square shaped SLM background image 414. In other examples, rectangular shaped background images 407 provide a square shaped SLM background image 414.

If the zero-order light 411 is projected directly through the first lens array 401, the second lens array 402, and the focusing lens 403 onto the background image plane 404, the zero-order light 411 may not be focused in a uniform manner on the background image plane 404, and accordingly may not illuminate the SLM background image 414 in a uniform manner. The nonuniform illumination of the SLM background image 414 by the zero-order light 411 can cause nonuniform brightness and accordingly reduced image quality in the image projected from the SLM. For example, in this case, the zero-order light 411 may appear at the background image plane 404 as a defocused circular light spot that does not illuminate in a uniform manner the rectangular or square shaped SLM background image 414. The defocusing of the zero-order light 411 at the background image plane 404 can be related to beam spreading in the zero-order light 411 based on the beam profile (e.g., Gaussian beam profile) and the propagation distance between the first lens array 401, the second lens array 402, and the focusing lens 403.

To increase uniform illumination of the SLM background image 414 by the zero-order light 411 at the background image plane 404, the optical elements 400 also include an optical tunnel 415 positioned between the first lens array 401 and the second lens array 402, and aligned with the center of the first lens array 401 and the second lens array 402 (as shown in the cross section view of the optical elements 400 in FIG. 4). The optical tunnel 415 is configured to project the zero-order light 411 from the first lens array 401 to the second lens array 402. The optical tunnel 415 is an optical waveguide for the zero-order light 411 that extends from the center of and through the first lens array 401 to the center of the second lens array 402. As shown in FIG. 4, the optical tunnel 415 extends through the first lens array 401 from one end facing the PLM image plane 409 to the other end facing the second lens array 402. The optical tunnel 415 also extend partially into the second lens array 402, at a certain depth inside the second lens array 402, at one end of the second lens array 402 that faces the first lens array 401. For example, the optical tunnel 415 can extend from a first end of the second lens array 402 which faces the first lens array 401 into approximately a quarter (25%) or half (50%) of the total thickness of the second lens array 402, in the direction of the optical axis passing through the first lens array 401 and second lens array 402. In examples, the optical tunnel 415 can extend from the first end of the second lens array 402 into a portion of the total thickness of the second lens array 402 that is determined to provide a certain spread in the projection of the zero-order light 411 on the background image plane 404.

The optical tunnel 415 is configured to limit or control the beam spread in the zero-order light 411 that propagates between the first lens array 401 and the second lens array 402. The optical tunnel 415 is also configured to shape a zero-order light spot 413, which is the projection of the zero-order light 411 on the background image plane 404. As shown in FIG. 4, the zero-order light spot 413 can be projected to cover in a uniform manner and match the shape of the SLM background image 414 at the background image plane 404. For example, the optical tunnel 415 may be a hollow tunnel, made of a dielectric material such as glass, with reflective inner side walls that direct the light from one end of the optical tunnel 415 to the other end. In other examples, the optical tunnel 415 may be a slab waveguide with a rectangular or square profile that is filled with a dielectric material (e.g., glass). In examples, the optical tunnel 415 may be an optical fiber with a rectangular or square profile. The two ends of the optical tunnel 415 are positioned at the respective centers of the first lens array 401 and the second lens array 402. The respective centers are central points positioned between the lenses 405 and 406 of the first lens array 401 and the second lens array 402, respectively. Accordingly, the optical tunnel 415 projects the zero-order light 411 from the first lens array 401 to the second lens arrays 402 without the diffraction orders 410 of the background image light 408, which are projected by the lenses 405 and 406 around the optical tunnel 415.

The second lens array 402 also includes an embedded lens 416 coupled to and positioned at the center of the second lens array 402, between the lenses 406 (as shown in the cross section view of the optical elements 400 in FIG. 4). The size (e.g., diameter) of the embedded lens 416 may be smaller than the diameter of the lenses 406 in the second lens array 402. The embedded lens 416 is configured to project the zero-order light 411 from the optical tunnel 415 to the focusing lens 403. For example, the embedded lens 416 is the embedded lens 226 in the second lens array 222 of the apparatus 201, which projects the zero-order light 219 of the PLM 204 from the optical tunnel 227 to the focusing optics 223. In another example, the embedded lens 416 is the embedded lens 319 in the second lens array 315 of the apparatus 300, which projects the zero-order light 313 of the PLMs 301 from the optical tunnel 320 to the focusing optics 316. The embedded lens 416 is also configured to focus and project the zero-order light 411 from the optical tunnel 415 onto the focusing lens 403, which reduces the spreading and accordingly increases the uniform illumination of the zero-order light spot 413 over the SLM background image 414 on the background image plane 404 (as shown in the front view of the background image plane 404 in FIG. 4).

Figure 5:
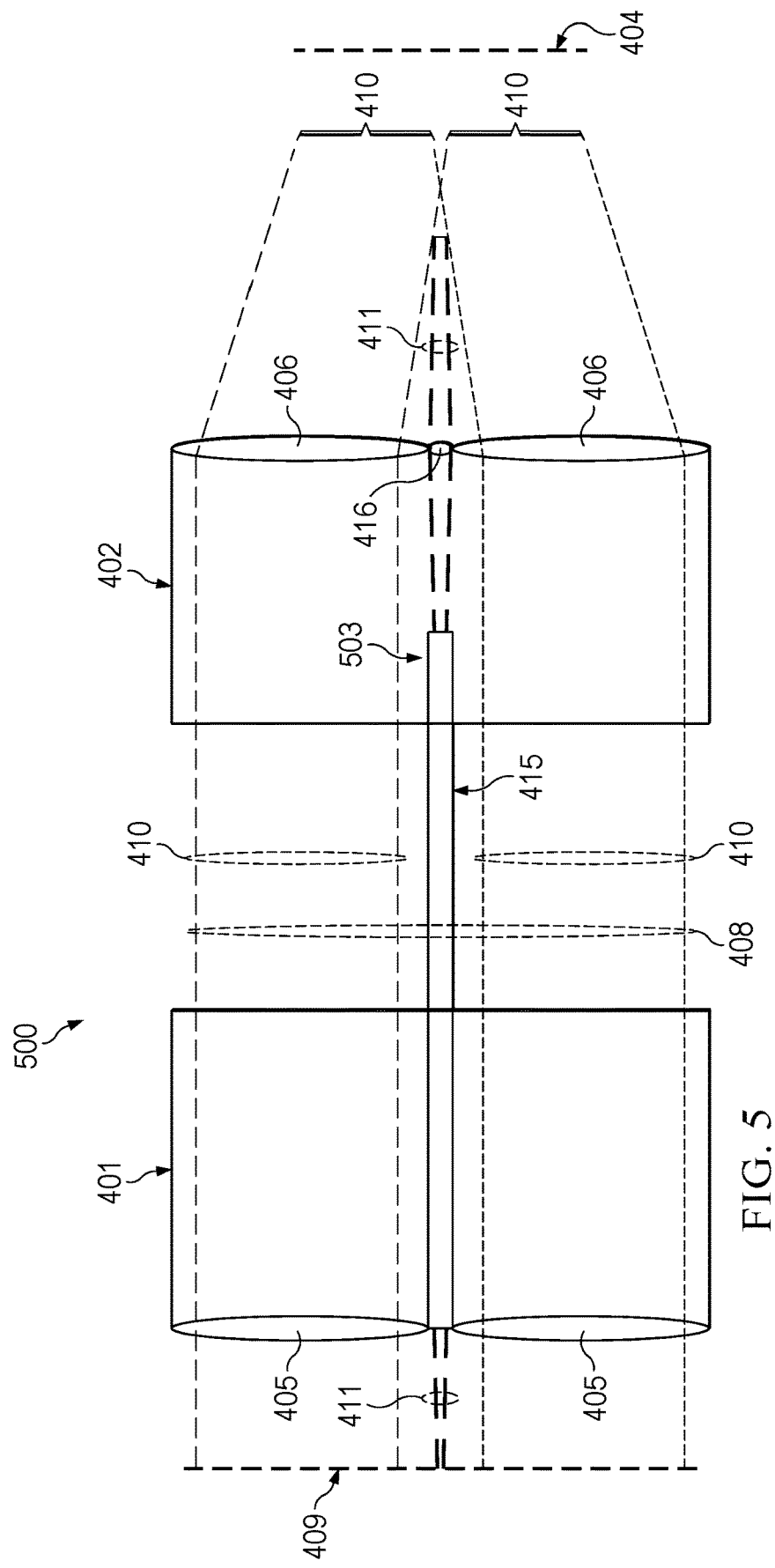
FIG. 5 is a diagram of optics in the optical elements of FIG. 4 for projecting a zero-order light with a background image light and provide uniform zero-order light illumination for a projected image, in accordance with various examples.

FIG. 5 shows optics 500 in the optical elements 400 for projecting the zero-order light 411 and the background image light 408 and provide uniform zero-order light illumination for a projected image, in accordance with various examples. The optics 500 include the lenses 405 in the first lens array 401 and the lenses 406 in the second lens array 402. The lenses 406 project the diffraction orders 410 in the background image light 408 from the lenses 405 onto the focusing lens 403 (pictured in FIG. 4). The embedded lens 416 is positioned between the lenses 406 and can be smaller than the lenses 406. As shown in FIG. 5, the size of the embedded lens 416 may match the profile dimension of the optical tunnel 415 which can also be smaller than the size of the lenses 405. For example, the embedded lens 416 can have approximately the same diameter as the optical tunnel 415 or can have a larger diameter than the optical tunnel 415.

FIG. 5 shows a side view of the first lens array 401 and the second lens array 402 with two lenses 405 and two lenses 406, respectively, that focus two respective diffraction orders 410 in the background image light 408. As shown, the optical tunnel 415 can extend entirely through the first lens array 401 and partially into the second lens array 402. A portion 503 of the optical tunnel 415 may be embedded in the center of the second lens array 402 between the lenses 406, at the first side of the second lens array 402 which faces the first lens array 401. For example, the portion 503 can be within 25% to 50% of the total thickness of the second lens array 402 between the lenses 406. The portion 503 of the optical tunnel 415 at the first side of the second lens array 402 is also aligned with the embedded lens 416 at the second side of the lens array 402 which faces the focusing lens 403. The diameter of the embedded lens 416 may be equal to or larger than the diameter of the optical tunnel 415 to collect all the zero-order light 411 projected from the optical tunnel 415 onto the embedded lens 416. The zero-order light 411 is projected from the PLM image plane 409 onto the focusing lens 403 (pictured in FIG. 4) by the optical tunnel 415 and the embedded lens 416 without the lenses 405 and 406. The diffraction orders 410 in the background image light 408 are projected by the lenses 405 and 406 without the optical tunnel 415 and the embedded lens 416.

Figure 6:
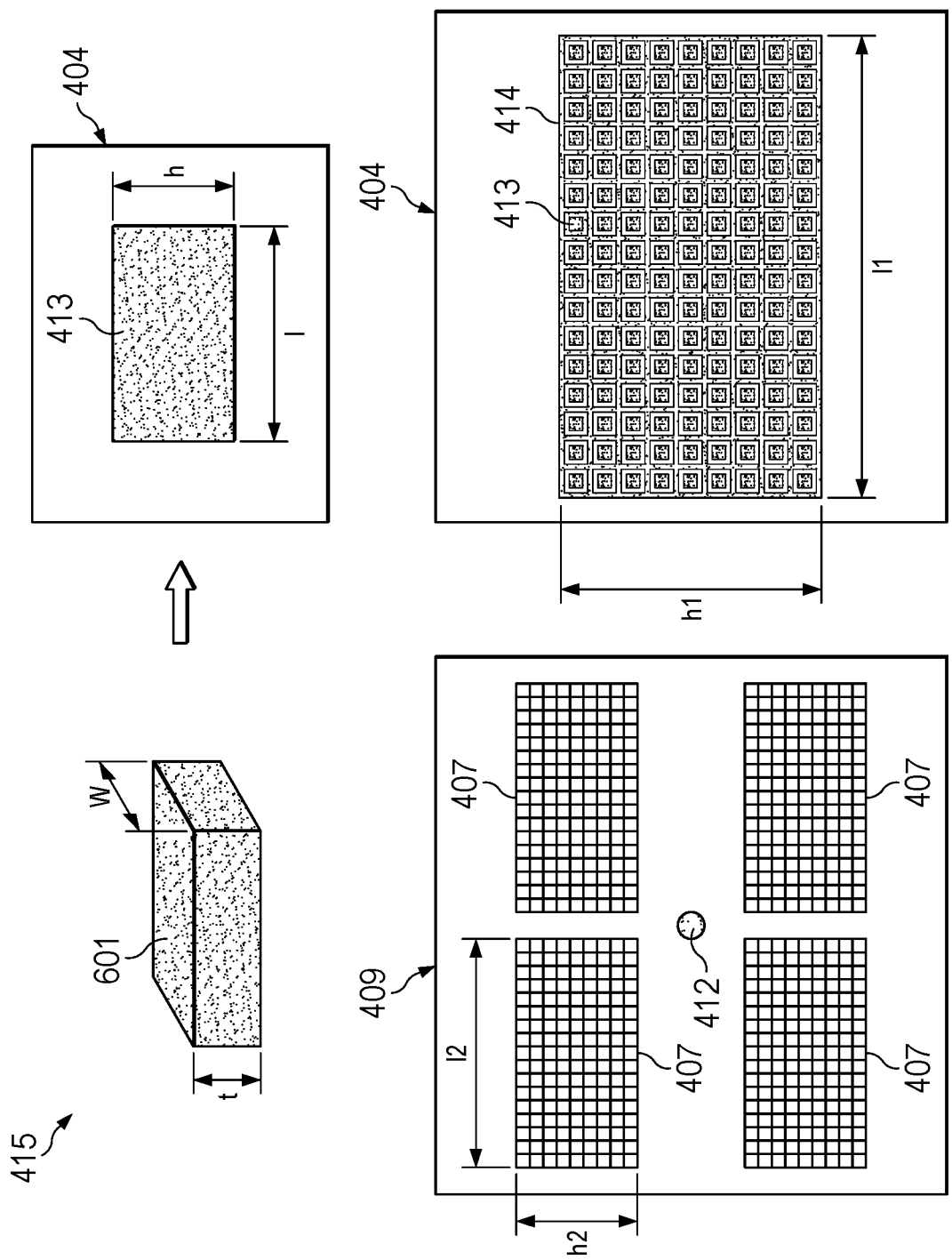
FIG. 6 is a diagram of an optical tunnel in the optical elements of FIG. 4 for projecting a zero-order light, in accordance with various examples.

FIG. 6 shows the optical tunnel 415 in the optical elements 400 for projecting the zero-order light 411, in accordance with various examples. The optical tunnel 415 can be a rectangular slab waveguide 601 made of a dielectric material, such as glass, and configured to guide and transfer optical wave modes in the zero-order light 411 from one end of the optical tunnel 415 to the other end. For example, the rectangular slab waveguide 601 can be a hollow tunnel made of the dielectric material, or a can be a tunnel filled with a dielectric material. The propagation of the optical wave modes in the zero-order light 411 is dependent on the profile dimensions of the rectangular slab waveguide 601 including the width (w) and thickness (t), the wavelengths of the zero-order light 411, and the refractive indices of the dielectric material of the rectangular slab waveguide 601 and of the surround material (e.g., air). In examples, the width and the thickness of the rectangular slab waveguide 601 can be between few millimeters (mm) for an optical tunnel 415 that extends in length to tens of mm. For example, the width and the thickness of the rectangular slab waveguide 601 can be between such as between 0.17 mm and 1.4 mm, or between 1.7 mm and 14 mmm, for a tunnel that has a length within 30 mm. Examples of the dielectric material of the rectangular slab waveguide 601 include $SiO_2$ and glass.

To project the zero-order light 411, the profile dimensions of the rectangular slab waveguide 601 can be based on the wavelengths of the color modes of the light sources that provide the zero-order light 411, such as the light sources 207 in the apparatus 201 or the light sources 302 in the apparatus 300. The profile of the rectangular slab waveguide 601 also determines the shape of a zero-order light spot 413 which is the projection of the zero-order light 411 on the background image plane 404. The zero-order light spot 413 is formed by relaying the zero-order light spot 412, which is the projection of the zero-order light 411 at the PLM image plane 409 through the rectangular slab waveguide 601 (the optical tunnel 415) between the first and second lens arrays 401 and 402 and through the focusing lens 403. FIG. 6 also shows front views of the background image plane 404 and the PLM image plane 409. The rectangular profile of the rectangular slab waveguide 601 reshapes the circular zero-order light spot 412 on the PLM image plane 409 into a rectangular shaped zero-order light spot 413 on the background image plane 404. The ratio of the length (l) to height (h) of the rectangular shaped zero-order light spot 413 also matches the ratio of the width (w) to thickness (t) of the rectangular slab waveguide 601.

FIG. 6 shows a rectangular shaped SLM background image 414 on the background image plane 404 that is formed by projecting four rectangular shaped PLM background images 407 of the diffraction orders 410 (pictured in FIGS. 4 and 5) in the background image light 405 through the first and second lens arrays 401 and 402 and focusing the diffraction orders 410 by the focusing lens 403 onto the background image plane 404. The shape and the ratio of the length (l1) to height (h1) of the rectangular shaped SLM background image 414 on the background image plane 404 are based on the shape and the ratio of the length (l2) to height (h2) of the rectangular shaped PLM background images 407 on the PLM image plane 409. By determining the shape and the ratio of the width (w) to thickness (t) of the rectangular slab waveguide 601, the ratio of the length (l) to height (h) of the rectangular shaped zero-order light spot 413 on the background image plane 404 can be matched to the ratio of the length (l1) to height (h1) of the projected and focused rectangular shaped SLM background image 414 to provide uniform illumination of the rectangular shaped SLM background image 414 by the zero-order light 411.

Figure 7:
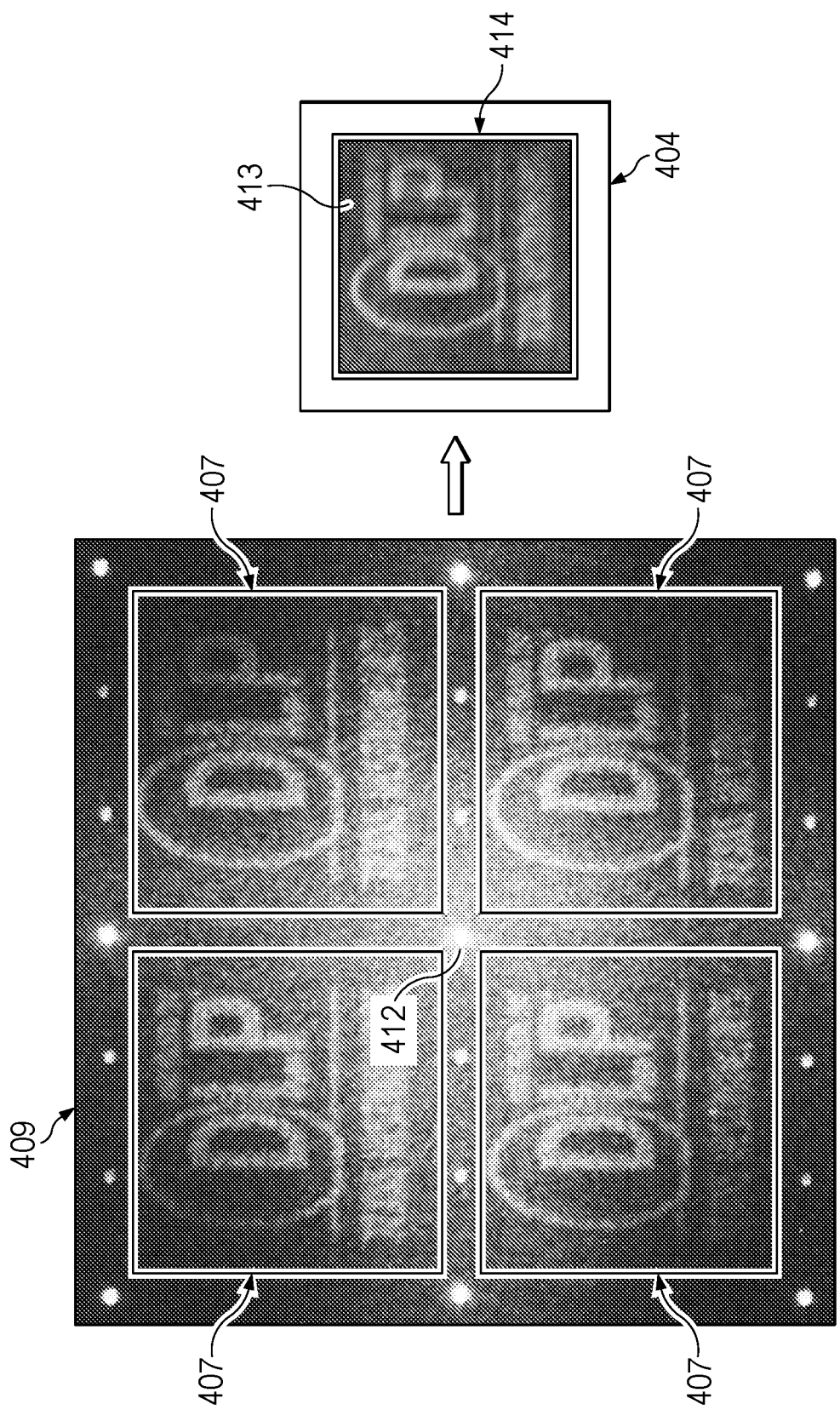
FIG. 7 shows PLM background images for an image projected by the optical elements of FIG. 4, in accordance with various examples.

FIG. 7 shows the PLM background images 407 for an image projected by the optical elements 400, in accordance with various examples. The PLM background images 407 are provided by projecting respective diffraction orders 410 in the background image light 408 on the PLM image plane 409. The PLM background images 407 of the diffraction orders 410 are similar copies of formed by the diffraction surface of the PLM. FIG. 6 shows an example of four PLM background images 407 projected by the diffraction orders 410 (pictured in FIGS. 4 and 5) in the background image light 408. In other examples, the number of PLM background images 407 may be a multiple of two, such as two, four, or eight background images projected simultaneously by the PLM. Each PLM background image 407 may have a different distribution of illumination across the image in the PLM image plane 409. The illumination distribution is dependent on the illumination of the respective diffraction order 410 in the background image light 408. The zero-order light spot 412 of the zero-order light 411 (pictured in FIGS. 4 and 5) is also projected on the PLM image plane 409 and illuminates a central point positioned between the four PLM background images 407.

FIG. 7 also shows the SLM background image 414 and the similarly shaped (by the optical tunnel 415) rectangular shaped zero-order light spot 413 on the background image plane 404. The SLM background image 414 is the overlap imaging of the PLM background images 407 through the optical elements 400. The overlap imaging of the PLM background images 407 on the background image plane 404 causes more uniform illumination of the background image light 408 across the SLM background image 414 in comparison to the PLM background images 407 on the PLM image plane 409. The rectangular shaped zero-order light spot 413 also uniformly illuminates and covers the SLM background image 414 on the background image plane 404. The uniform illumination of the SLM background image 414 is further increased by zero-order light spot 413 that is the projection of the zero-order light 411 through the optical tunnel 415 and the embedded lens 416 in the optical elements 400.

Figure 8:
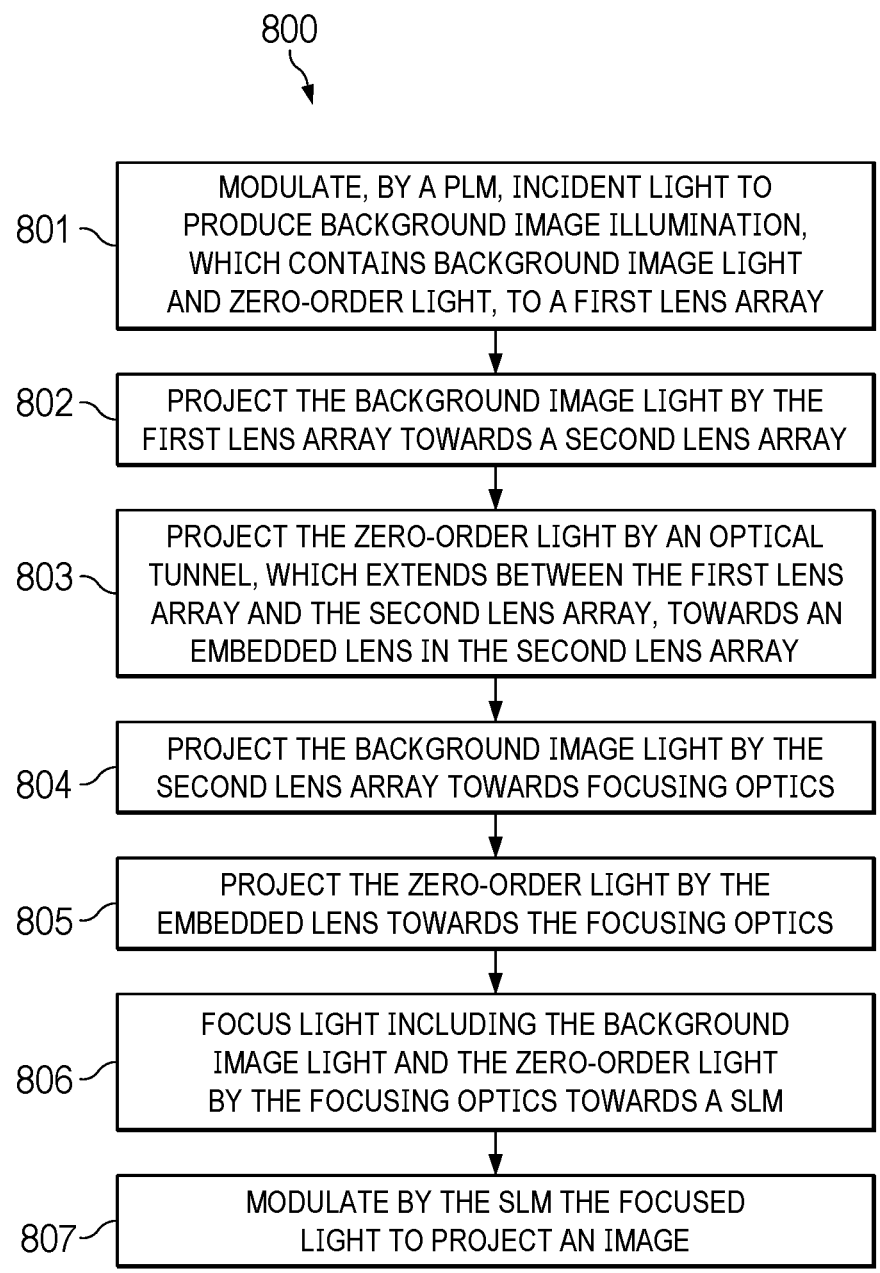
FIG. 8 is a flow diagram of a method for projecting a zero-order light with a background image light from a PLM onto an SLM to provide uniform zero-order light illumination for a projected image, in accordance with various examples.

FIG. 8 is a flow diagram of a method 800 for projecting a zero-order light with a background image light from a PLM onto an SLM to provide uniform zero-order light illumination for a projected image, in accordance with various examples. For example, the method 800 can be implemented by the optics 500 in the optical elements 400, or by the optical elements in the apparatus 201 or 300, of the display device 110. At step 801, incident light is modulated by a PLM to produce background image illumination, which contains background image light and zero-order light, to a first lens array. The PLM micromirrors are set to reflect light from a light source and produce the background image illumination for a SLM, including the background image light and zero-order light, to a first lens array. The background image light in the background image illumination is composed of diffraction orders formed by a diffraction surface of the PLM based on setting the PLM micromirrors. The diffraction orders in the background image light produce PLM background images to illuminate the SLM, which projects a projected image accordingly. For example, the PLM micromirrors 213 (or 310) of the PLM 204 (or 301) in the apparatus 201 (or 300) are set based on the controller 202 to reflect light from the light sources 207 (or 302) to produce background image illumination containing the background image light 217 (or 313) and the zero-order light 219 (or 313) for illuminating the SLM 205 (or 303), which then projects a projected image. At step 802, the background image light is projected by the first lens array towards a second lens array. For example, the diffraction orders in the background image light 408 are projected by the lenses 405 of the first lens array 401 to the respective lenses 406 of the second lens array 402.

At step 803, the zero-order light is projected by an optical tunnel, which extends between the first lens array and the second lens array, towards an embedded lens in the second lens array. The optical tunnel extends through the center of the first lens array and partially through the center of the second lens array. For example, the zero-order light 411 is projected by the optical tunnel 415 through the first lens array 401 and partially through the second lens array 402 at the centers of the first lens array 401 and the second lens array 402. The zero-order light 411 is projected from the portion 503 of the optical tunnel 415 to the embedded lens 416 at the center of the second lens array 402. The steps 802 and 803 may be performed simultaneously to project the background image light by the first lens array with the zero-order light by the optical tunnel towards the second lens array.

At step 804, the background image light is projected by the second lens array towards focusing optics. For example, the diffraction orders in the background image light 408 are projected by the respective lenses 406 of the second lens array 402 to the focusing lens 403. At step 805, the zero-order light is projected by the embedded lens towards the focusing optics. For example, the zero-order light 411 is projected by the embedded lens 416 at the center of the second lens array 402 onto the focusing lens 403. The steps 804 and 805 may be performed simultaneously to project the background image light with the zero-order light between the second lens array and the focusing optics.

At step 806, light including the background image light and the zero-order light is focused by the focusing optics towards a SLM. The background image light and the zero-order light can be focused by the focusing optics onto a background image plane on the SLM. The focusing of the zero-order light provides a uniform illumination of the zero-order light across the background image plane. The background image light and the zero-order light can be focused by the focusing optics onto an intermediate image plane at a focus point of the focusing optics. In turn, the intermediate image plane is imaged, also referred to herein as relayed, by illumination optics from the focus point to a background image plane on the surface of the SLM. For example, the focusing optics 223 (or 316) focus the background image light 217 (or 313) with the zero-order light 219 (or 313) onto an intermediate image plane at the focus point of the focusing optics 223 (or 316). The intermediate image plane is then relayed by the illumination optics 230 (or 330) onto the background image plane on the surface of the SLM 205 (or 303). In other examples, focusing and projection optics may project the background image light and the zero-order light from the second lens array onto a background image plane at the surface of the SLM without projecting an intermediate background image plane. At step 807, the focused light is modulated by the SLM to project an image. The SLM is controlled to modulate and project the background image light and the uniform illumination of the zero-order light to form the projected image.

The term "couple" appears throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A system or device that is described herein as including certain components may instead be adapted to be coupled to those components to form the described system or device.

While certain components may be described herein as being of a particular process technology, these components may be exchanged for components of other process technologies. Systems and devices described herein are reconfigurable to include the replaced components to provide functionality at least partially similar to functionality available prior to the component replacement.

Unless otherwise stated, "about," "approximately," or "substantially" preceding a value means +/−10 percent of the stated value. Modifications are possible in the described examples, and other examples are possible within the scope of the claims.

What is claimed is:

1. An apparatus, comprising:
    a phase light modulator (PLM) configured to produce background image illumination comprising background image light and zero-order light;
    a first lens array comprising first lenses, the first lens array optically coupled to the PLM, the first lenses configured to project the background image light;
    a second lens array optically coupled to the first lens array, the second lens array comprising second lenses, the second lenses configured to project the background image light projected from the first lens array;
    an optical tunnel extending between the first lens array and the second lens array, the optical tunnel optically coupled to the PLM, the optical tunnel configured to project the zero-order light;
    an embedded lens in the second lens array, the embedded lens optically coupled to the optical tunnel and configured to focus the zero-order light projected by the optical tunnel; and
    focusing optics optically coupled to the second lens array and to the embedded lens, the focusing optics configured to focus the background image light and the zero-order light onto a background image plane of a spatial light modulator (SLM).

2. The apparatus of claim 1, wherein the optical tunnel extends through a first center of the first lens array between the first lenses to a second center of the second lens array between the second lenses, and wherein the optical tunnel extends through the first lens array and extends partially into the second lens array.

3. The apparatus of claim 1, wherein the optical tunnel is a hollow tunnel made of a dielectric material with reflective inner side walls.

4. The apparatus of claim 1, wherein the optical tunnel is a slab waveguide with a rectangular profile that is filled with a dielectric material.

5. The apparatus of claim 1, wherein the embedded lens is smaller than the second lenses and the embedded lens is positioned at the second center of the second lens array between the second lenses.

6. The apparatus of claim 5, wherein the embedded lens and the optical tunnel are aligned with the second center of the second lens array, and wherein a first diameter of the embedded lens is equal to or larger than a second diameter of the optical tunnel.

7. The apparatus of claim 1, wherein the first lens array and the second lens array are 2×2 arrays.

8. A device comprising:
one or more light sources;
a phase light modulator (PLM) optically coupled to the one or more light sources;
a first lens array optically coupled to the PLM, the first lens array comprising first lenses;
a second lens array optically coupled to the first lens array, the second lens array comprising second lenses;
an optical tunnel extending between the first lens array and the second lens array;
an embedded lens in the second lens array optically coupled to the optical tunnel;
focusing optics optically coupled to the second lens array and to the embedded lens, the focusing optics comprising one or more focusing lenses; and
a spatial light modulator (SLM) optically coupled to the focusing optics.

9. The device of claim 8, further comprising illumination optics between the focusing optics and the SLM.

10. The device of claim 9, further comprising a diffuser at a focus point of the focusing optics between the focusing optics and the illumination optics.

11. The device of claim 8, wherein the first lens array, the second lens array, and the focusing optics are configured to project background image light from the PLM to the SLM.

12. The device of claim 8, wherein the optical tunnel, the embedded lens, and the focusing optics are configured to project zero-order light from the PLM to the SLM.

13. The device of claim 8, wherein the PLM is a first PLM optically coupled to a first light source, wherein the SLM is a first SLM, and wherein the device further comprises:
a first prism filter optically coupled between the focusing optics and the first SLM;
a second PLM optically coupled to a second light source and to the first lens array;
a second SLM;
a second prism filter optically coupled between the focusing optics and the second SLM;
a third PLM optically coupled to a third light source and to the first lens array;
a third SLM; and
a third prism filter optically coupled between the focusing optics and the third SLM.

14. The device of claim 13, wherein the first PLM is configured to modulate first incident light at a first wavelength from the first light source and project a first background image light with a first zero-order light to the first lens array, wherein the second PLM is configured to modulate second incident light at a second wavelength from the second light source and project a second background image light with a second zero-order light to the first lens array, and wherein the third PLM is configured to modulate third incident light at a third wavelength from the third light source and project a third background image light with a third zero-order light to the first lens array.

* * * * *